(12) United States Patent
He

(10) Patent No.: US 10,140,497 B1
(45) Date of Patent: Nov. 27, 2018

(54) METHODS AND SYSTEM FOR READING BARCODES CAPTURED ON MULTIPLE IMAGES

(71) Applicant: SYMBOL TECHNOLOGIES, LLC, Lincolnshire, IL (US)

(72) Inventor: Duanfeng He, South Setauket, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 15/702,183

(22) Filed: Sep. 12, 2017

(51) Int. Cl.
G06K 7/14 (2006.01)

(52) U.S. Cl.
CPC ......... *G06K 7/1491* (2013.01); *G06K 7/1413* (2013.01); *G06K 7/1443* (2013.01); *G06K 7/1452* (2013.01)

(58) Field of Classification Search
CPC .. G06K 7/1491; G06K 7/1452; G06K 7/1413; G06K 7/1443
USPC .................................... 235/462.11
See application file for complete search history.

(56) References Cited

U.S. PATENT DOCUMENTS

| | | | |
|---|---|---|---|
| 5,241,164 A | | 8/1993 | Pavlidis et al. |
| 5,343,028 A | * | 8/1994 | Figarella .............. G06K 7/1093 235/462.09 |
| 5,444,231 A | | 8/1995 | Shellhammer et al. |
| 5,457,308 A | | 10/1995 | Spitz et al. |
| 5,495,097 A | | 2/1996 | Katz et al. |
| 5,621,203 A | | 4/1997 | Swartz et al. |
| 7,344,080 B2 | | 3/2008 | Vinogradov et al. |
| 7,852,519 B2 | * | 12/2010 | Meier ................. G06K 7/10722 235/462.32 |
| 8,083,147 B2 | | 12/2011 | Aker et al. |
| 9,361,499 B2 | * | 6/2016 | Bachelder ............ G06K 7/1465 |
| 9,734,376 B2 | * | 8/2017 | Nadabar .............. G06K 7/1491 |
| 2015/0347798 A1 | | 12/2015 | Madej |

FOREIGN PATENT DOCUMENTS

WO 2016/089481 A1 6/2016

\* cited by examiner

*Primary Examiner* — Seung H Lee
(74) *Attorney, Agent, or Firm* — Yuri Astvatsaturov

(57) ABSTRACT

At least some embodiments of the present invention relate to methods for stitching barcodes captured over multiple images. In an embodiment, the method includes capturing a first and second portions of a barcode in respective images, determining a presence of a match between the two captured portions, stitching the two portions pursuant to the match, and validating the combined string with the assistance of a reference mark.

23 Claims, 8 Drawing Sheets

METHODS AND SYSTEM FOR READING BARCODES CAPTURED ON MULTIPLE IMAGES

BACKGROUND OF THE INVENTION

The use of machine-readable indicia (i.e., symbols) to convey encoded information is well known in various industries. For example, in retail, one-dimensional barcodes typically encode Universal Product Codes (UPCs) that are used to identify various products. The use of barcodes (both one-dimensional and two-dimensional) is also very prevalent in the shipping industry where barcodes encode information that relates to various facets of the shipment in question.

Normally, to extract the data encoded within a barcode, an image of the barcode is optoelectrically captured by an imager and the pattern represented by the barcode is decoded from that image. While this can be achieved with relative ease when the barcode fully and clearly fits within the field of view of the imager, difficulties can arise in certain situations. For instance, a barcode may be too long to practically fit within an imager's field of view when the barcode is imaged at a normal working distance. In another example, a barcode may be affixed to a non-flat item such that only a portion of that barcode is readable with the remaining portion being out of sufficient view. In both of these cases, a single image capture will likely be insufficient to properly decode the barcode. Instead, multiple image captures, with each image capturing a portion of the barcode, have to be performed and the portions of the barcode will have to be accurately and efficiently stitched together in order to reconstruct and decode the original barcode input.

Accordingly, there is a need for improved devices, systems, and methods directed towards reading barcodes captured on multiple images and reconstructing the original barcode input from those images.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
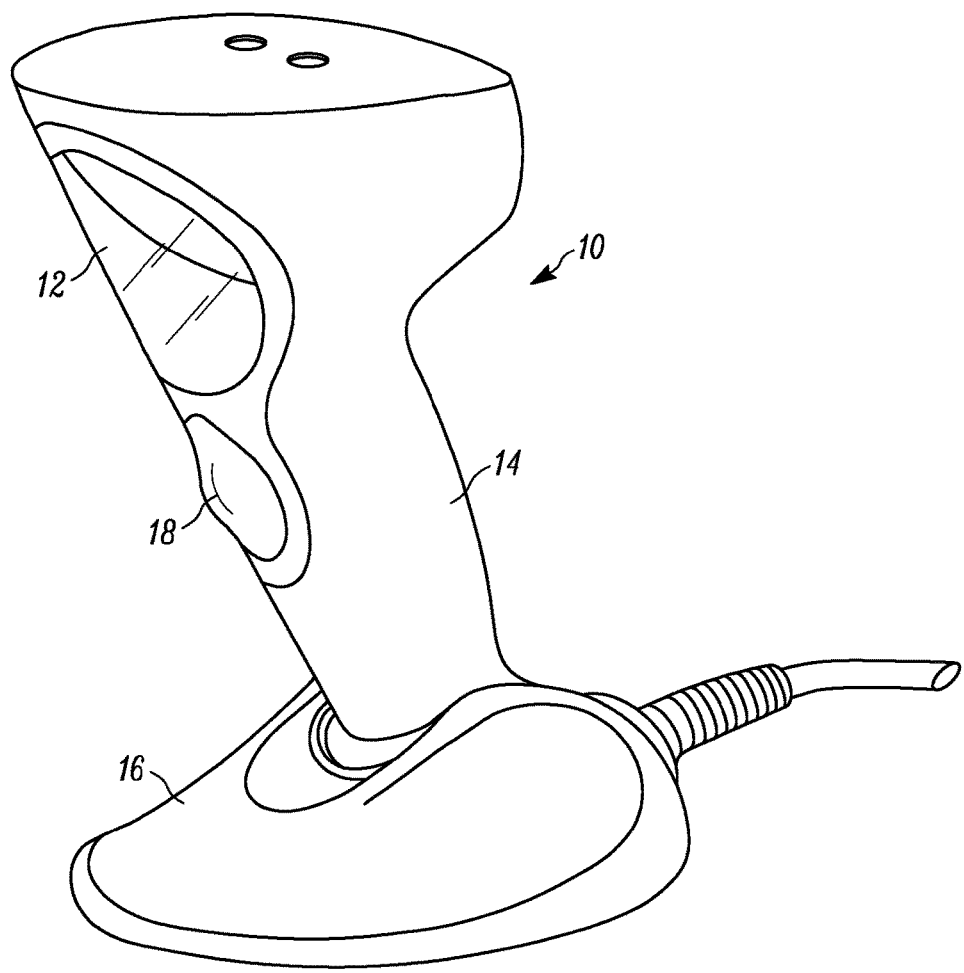
FIG. 1 is a perspective view of a scanner according to an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In an embodiment, the present invention is a method of stitching a machine-readable code representing an encoded string. The method includes: in a first image, optoelectrically capturing a first portion of the machine-readable code, the first portion extending to a first boundary; in a second image, optoelectrically capturing a second portion of the machine-readable code, the second portion being different from the first portion, the second portion extending to a second boundary; determining a presence of a match between a first matching part of the first portion and a second matching part of the second portion, the first matching part abutting the first boundary and the second matching part abutting the second boundary; responsive to the presence of the match, determining a presence of an overlap between the first matching part and the second matching part; and responsive to the presence of the overlap, stitching the first portion of the machine-readable code with the second portion of the machine-readable code, the stitching being based at least in part on the overlap.

In another embodiment, the present invention is a method of stitching a machine-readable code representing an encoded string. The method includes: in a first image, optoelectrically capturing a first portion of the machine-readable code, the first portion extending to a first boundary; in a second image, optoelectrically capturing a second portion of the machine-readable code, the second portion being different from the first portion, the second portion extending to a second boundary; determining a presence of a match between a first matching part of the first portion and a second matching part of the second portion, the first matching part abutting the first boundary and the second matching part abutting the second boundary; responsive to the presence of the match, stitching the first portion of the machine-readable code with the second portion of the machine-readable code, the stitching being based at least in part on the match and producing a stitched element; and verifying a validity of the stitched element by: determining a presence of a reference mark in the first image and in the second image; determining a first position of the reference mark relative to the first matching part; determining a second position of the reference mark relative to the second matching part; and evaluating the first position and the second position.

In yet another embodiment, the present invention is a method of stitching a machine-readable code representing an encoded string. The method includes: in a first image, optoelectrically capturing a first portion of the machine-readable code, the first portion extending to a first boundary; in a second image, optoelectrically capturing a second portion of the machine-readable code, the second portion being different from the first portion, the second portion extending to a second boundary; determining a presence of a match between a first matching part of the first portion and a second matching part of the second portion, the first matching part abutting the first boundary and the second matching part abutting the second boundary; determining a first overlap between the first matching part and the second matching part, the first overlap being one of a complete overlap or a partial overlap; responsive to the presence of the match, stitching the first portion of the machine-readable code with the second portion of the machine-readable code, the stitching being based at least in part on the first overlap and producing a stitched element; and verifying a validity of the stitched element by: determining a presence of a reference mark in the first image and in the second image; determining a first position of the reference mark in the first image; determining a second position of the reference mark in the second image; and evaluating the first position and the second position.

Figure 2:
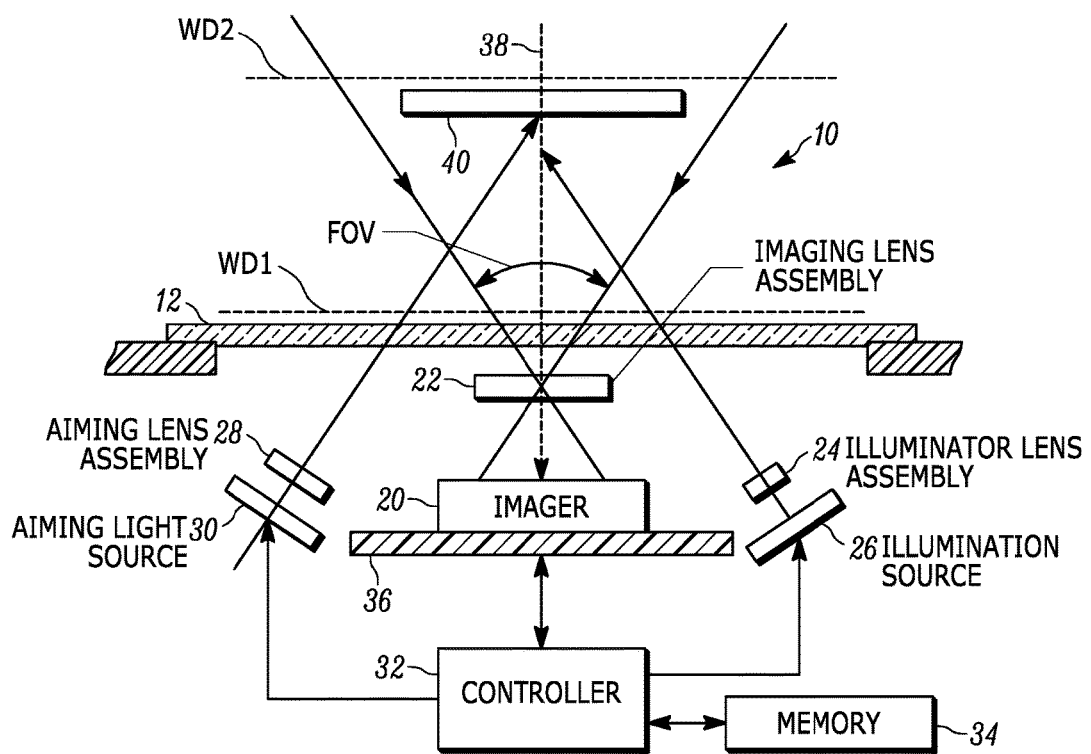
FIG. 2 is a block diagram of some of the components of the scanner of FIG. 1.

Turning now to the figures, FIGS. 1 and 2 depict an exemplary imaging scanner 10 than can be used in the implementation of the present invention. The imaging scanner 10 has a window 12 and a housing 14 with a handle. The imaging scanner 10 also has a base 16 for supporting itself on a countertop. The imaging scanner 10 can be used in a hands-free mode as a stationary workstation when it is placed on the countertop. The imaging scanner 10 can also be used in a handheld mode when it is picked up off the countertop and held in an operator's hand. In the hands-free mode, products can be slid, swiped past, or presented to the window 12. In the handheld mode, the imaging scanner 10 can be moved towards a barcode on a product, and a trigger 18 can be manually depressed to initiate imaging of the barcode. In some implementations, the base 16 can be omitted, and the housing 14 can also be in other shapes.

FIG. 2 illustrates a schematic of an imaging scanner 10 in accordance with some embodiments. The imaging scanner 10 in FIG. 2 includes the following components: (1) a solid-state imager 20 positioned behind an imaging lens assembly 22; (2) an illuminating lens assembly 24 positioned in front of an illumination source 26; (3) an aiming lens assembly 28 positioned in front of an aiming light source 30; and (4) a controller 32 coupled to a memory 34. In FIG. 2, the imaging lens assembly 22, the illuminating lens assembly 24, and the aiming lens assembly 28 are positioned behind the window 12. The solid-state imager 20 is mounted on a printed circuit board 36 in the imaging scanner 10.

The solid-state imager 20 can be a CCD or a CMOS imaging device. The solid-state imager 20 generally includes multiple pixel elements. These multiple pixel elements can be formed by a one-dimensional array of photosensitive elements arranged linearly in a single row. These multiple pixel elements can also be formed by a two-dimensional array of photosensitive elements arranged in mutually orthogonal rows and columns, or in any other arrangement. The photosensitive elements of a two-dimensional arrangement form a substantially flat surface. The solid-state imager 60 is operative to detect light captured by an imaging lens assembly 22 along an optical path or axis 38 through the window 12. Generally, the solid-state imager 20 and the imaging lens assembly 22 are designed to operate together for capturing light scattered, reflected, or emitted from a barcode 40 as pixel data over a two-dimensional field of view (FOV).

The barcode 40 generally can be located anywhere in a working range of distances between a close-in working distance (WD1) and a far-out working distance (WD2). In one specific implementation, WD1 is about a few inches from the window 12, and WD2 is about a few feet from the window 12. Some of the imaging scanners can include a range finding system for measuring the distance between the barcode 40 and the imaging lens assembly 22. Some of the imaging scanners can include an auto-focus system to enable a barcode be more clearly imaged with the solid-state imager 20 based on the measured distance of this barcode. In some implementations of the auto-focus system, the focus length of the imaging lens assembly 22 is adjusted based on the measured distance of the barcode. In some other implementations of the auto-focus system, the distance between the imaging lens assembly 22 and the solid-state imager 20 is adjusted based on the measured distance of the barcode.

In FIG. 2, the illuminating lens assembly 24 and the illumination source 26 are designed to operate together for generating an illuminating light towards the barcode 40 during an illumination time period. The illumination source 26 can include one or more light emitting diodes (LED). The illumination source 26 can also include a laser or other kind of light sources. The aiming lens assembly 28 and the aiming light source 30 are designed to operate together for generating a visible aiming light pattern towards the barcode 40. Such aiming pattern can be used by the operator to more-accurately aim the imaging scanner at the barcode. The aiming light source 30 can include one or more LEDs. The aiming light source 30 can also include a laser or other kind of light sources.

In FIG. 2, the controller 32, such as a microprocessor, is operatively connected to the solid-state imager 20, the illumination source 26, and the aiming light source 30 for controlling the operation of these components. The controller 32 can also be used to control other devices in the imaging scanner. The imaging scanner 10 includes a memory 34 that can be accessible by the controller 32 for storing and retrieving data. In many embodiments, the controller 32 also includes a decoder for decoding one or more barcodes that are within the FOV of the imaging scanner 10. In some implementations, the barcode 40 can be decoded by digitally processing a captured image of the barcode with a microprocessor.

In operation, in accordance with some embodiments, the controller 32 sends a command signal to energize the illumination source 26 for a predetermined illumination time period. The controller 32 then causes the solid-state imager 20 to capture an image of the barcode 40. The captured image of the barcode 40 is transferred to the controller 32 as pixel data. Such pixel data is digitally processed by the decoder in the controller 32 to decode the barcode. The information obtained from decoding the barcode 40 is then stored in the memory 34 or sent to other devices for further processing.

Figure 3A:
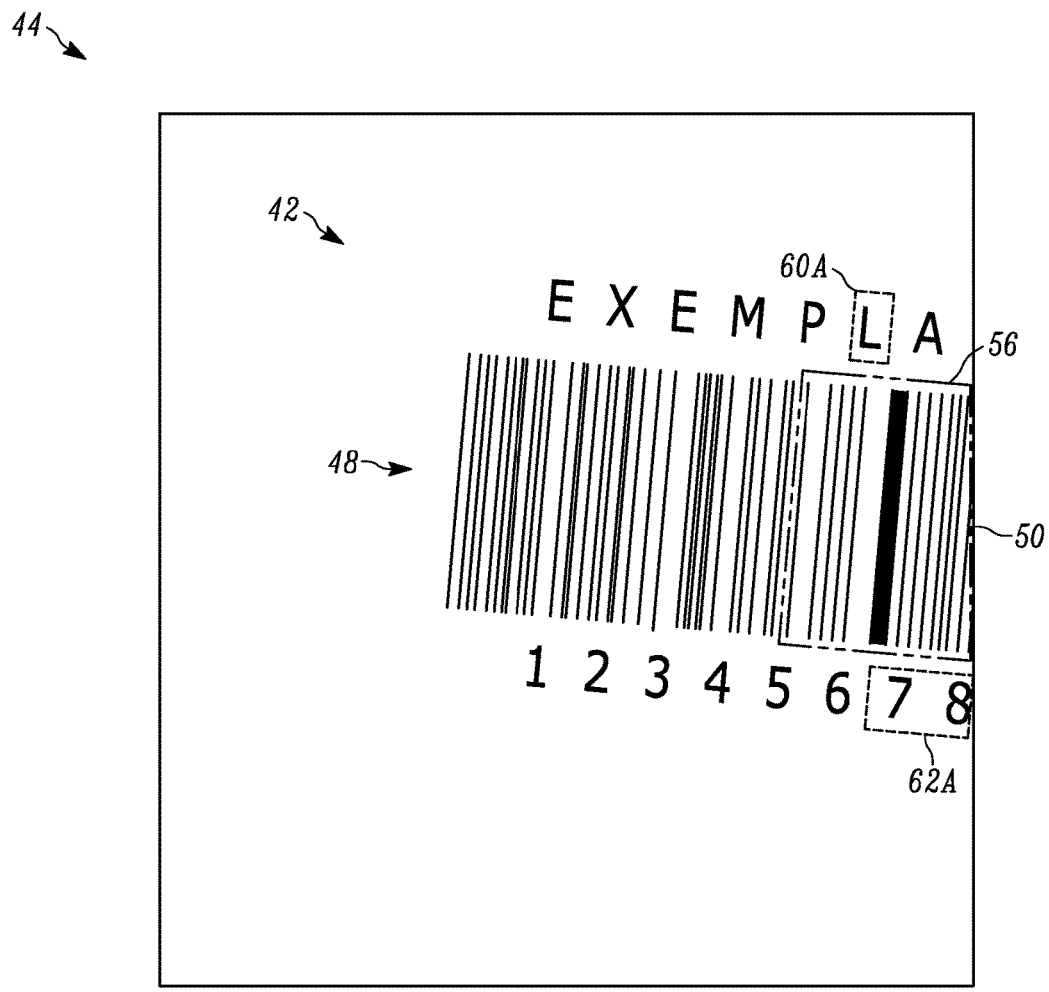
FIGS. 3A and 3B are, respectively, first and second images capturing a single barcode in accordance with an embodiment of the present invention.
Figure 3B:
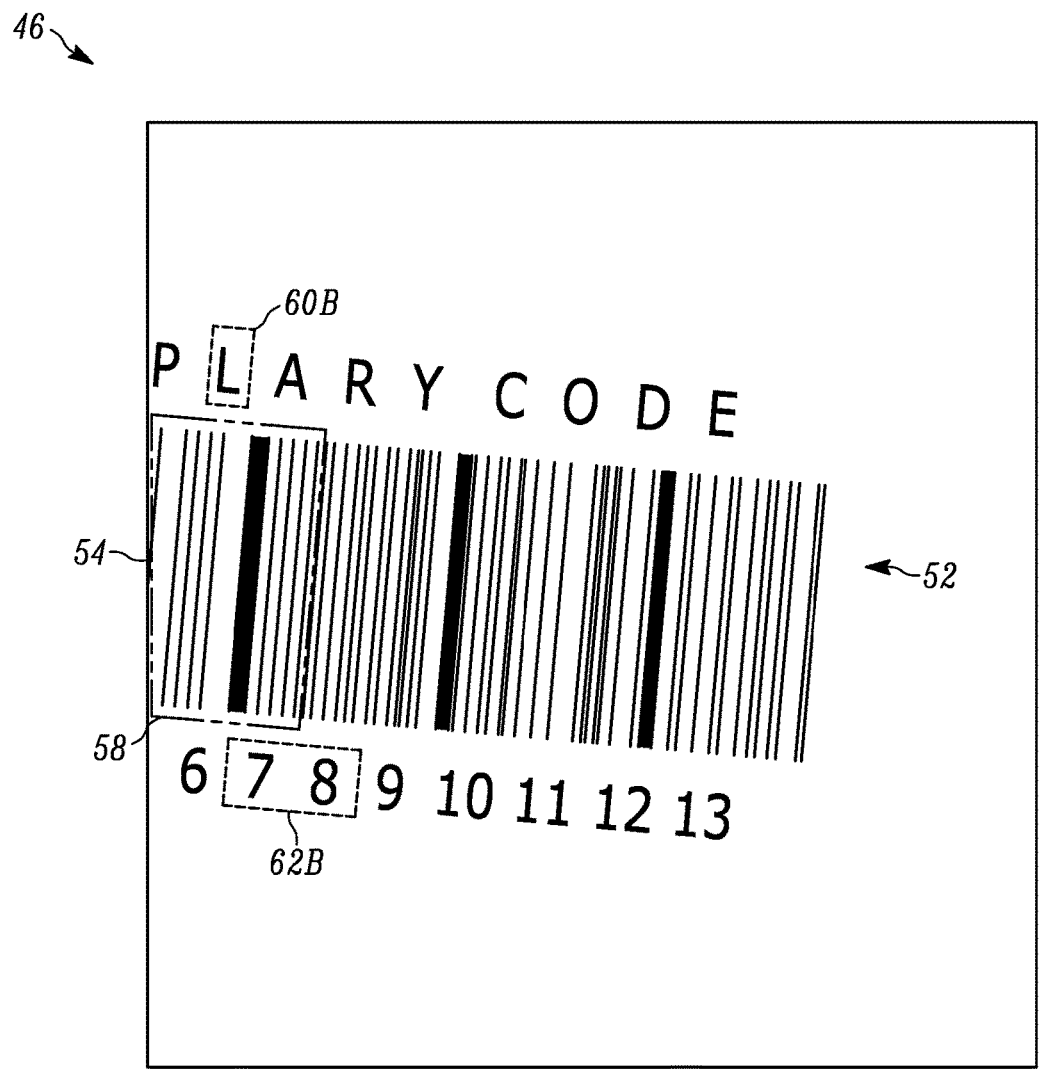

In some embodiments, the scanner 10 is configured to stitch and verify portions of a single barcode captured over multiple images. Referring to FIGS. 3A and 3B, shown therein is an exemplary barcode 42 that, for some reason (e.g., barcode is too large to fit within the FOV and still remain between the WD1 and WD2), was not captured within a single image. As such, FIG. 3A depicts a first image 44 and FIG. 3B depicts a second image 46. Captured within the first image 44 is a first portion 48 of the barcode 42 that extends to/abuts an edge 50 of the first image 44. Captured within the second image 46 is a second portion 52 of the barcode 42 that extends from/abuts an edge 54 of the second image 46. In addition to capturing portions of the barcode 42, each image captures at least one reference mark. As contemplated herein, a reference mark is any element distinct from the barcode, and can take any shape or form. In case of FIGS. 3A and 3B, any portion of any of the letters and/or numbers that surround the barcode 42 may be considered a reference mark. Likewise, a collection of elements may also be considered to be a reference mark. For example, referring to the second image, while the letter "E" or any part thereof may, alone, be considered a reference mark, the entire word "CODE" may also be considered a reference mark. Likewise, the letter "L" and number "8" may separately form reference marks, or may collectively form a single reference mark.

In the currently described embodiment, a part 56 of the first portion 48 of the barcode 42 matches another part 58 of the second portion 52. The controller 32 is configured to recognize such a match between the two matching parts 56, 58. In some embodiments, this may be achieved on a pixel-by-pixel comparison of at least some portions of the respective images which are occupied by the respective portions of the barcode. In some embodiments, a match may be found via an element-by-element comparison of at least some barcode elements in the respective images. For a one dimensional barcode, elements can be formed by the barcode's bars and spaces (which may be represented as bars of a color that is different from the remaining bars). In some embodiments, the match may be found via a codeword-to-codeword comparison of at least some barcode codewords in the respective images. A barcode codeword is generally represented by a series of barcode elements with a certain patterns/characteristic. In some embodiments, the match may also be found by a decoded character-to-decoded character comparison of at least some decoded portions of the barcode portions in the respective images.

Once it is determined that matching parts 56, 58 are present in the first and second portions 48, 52, these parts can act as linking elements and help stitch the two barcode portions together to obtain the original barcode 42. During this process, an advantageous overlap evaluation may be included to assist in the stitching process and/or to assist in the verification of the stitch being correct.

The need for an appropriate overlap evaluation can be exemplified with respect to the following example. For instance, the first portion of the barcode may encode a first string "123451212" and the second portion of the barcode may encode a second string "12126789." Based on the evaluation of these two strings, it becomes apparent that "1212" is shared between the two strings, and thus, "1212" of the first string and the "1212" of the second string would form the matching parts of those strings. This alone, however, may not be enough to accurately stitch the first and second portions together. Even though "1212" is shared between both strings, this may be caused by the original input being "12345121212126789," "123451212126789," "1234512126789," or some other input. As such, knowing the existence of the matching parts alone might not be enough to arrive at the appropriate output. Though in some instances this problem can be addressed by knowing the total number of elements encoded in the entire barcode and factoring this number in during the stitching process, this may not work in situations where the barcode is of an unknown length. Furthermore, if the entire barcode is captured over a span of more than two images, having a total number of elements encoded in the entire barcode may still not be enough. Similarly, knowing a total number of elements may not be sufficient in configurations where the scanner is configured to scan barcodes of varying known lengths.

As such, advantageously, the scanner 10, by way of the controller 32, determines the appropriate overlap between the first portion 48 and the second portion 52. In some embodiments, this is done by evaluating the presence of at least one reference mark and the position of that at least one reference mark relative to some sections of the barcode 42. In some embodiments, a reference mark is a non-linear, two-dimensional mark. Preferably, the reference mark includes easily locatable features like a curved line, angled lines, intersecting lines, and other similar features. Referring again to FIGS. 3A and 3B, each image 44, 46 includes a first reference mark 60 (represented as 60*a* in the first image 44 and as 60*b* in the second image 46) and a second reference mark 62 (represented as 62*a* in the first image 44 and as 62*b* in the second image 46). Reference mark 60 may be selected as the mark of choice by the controller 32 as it is present in both images and it includes two lines meeting at a defined angle. Upon the detection of the reference mark 60 (and in particular 60*a*), the controller 32 determines its position relative to the first matching part 56 in the first image 44. The controller 32 also determines the mark's 60 (in particular 60*b*) position relative to the second matching part 58 in the second image 46. The relative positions may be expressed as vector values, and they may be determined in any number of way, including, for example, relying on the centroids of the endpoint regions (e.g., mark 60*a* and first matching part 56). Having the two relative positions, it is then possible to make a determination of the appropriate overlap between the first and second portions 48, 52 of the barcode 42.

For instance, the controller may be configured to subtract the one relative location from another relative location and evaluate the resulting value. In some embodiments, the resulting value may be expressed by a distance between the two locations which is determined from the displacement vector obtained by the subtraction operation. In the event that the resulting value falls below a predefined threshold, the controller may be configured to associate the two matching portions 56, 58 with the same section of the barcode 42, with the same codewords of the barcode 42, or with the same section of the string encoded by the barcode 24. From there, the controller may further be configured to stitch the first and second portions 48, 52 or the strings encapsulated therein with the matching portions 56, 58 being entirely overlapping. In this case, the matching portions 56, 58 would each represent the same portion of the barcode. In an alternate event where the resulting value falls above a predefined threshold, the controller may also be configured to associate the two matching portions 56, 58 with different sections of the barcode 42 or with different sections of the string encoded by the barcode 24, where the different sections have a partial overlap. From there, the controller may further be configured to stitch the first and second portions 48, 52 or the strings encapsulated therein with the matching portions 56, 58 being partially overlapping. The same set of steps performed with respect to the reference mark 60 may also be performed with reference mark 62.

Generally speaking, in some embodiments, the stitching of the barcode portions may be done on a pixel-level, aligning each overlapping pixel of the different portions. In some embodiments, stitching of the barcode portions may be done on an element-by-element level, aligning the overlapping elements of the different portions. In some embodiments, stitching of the barcode portions may be done on a codeword-by-codeword level, aligning the overlapping codewords of the different portions. And in some embodiments, stitching of the barcode portions may be done on a decoded character-by-decoded character level, aligning the overlapping decoded characters of the different portions.

In at least some embodiments, the controller 32 may be configured to correct for perspective, or other, distortion based on the portions of the barcode captured in the respective images. Given that a barcode generally has a rectangular shape with black and white vertical bars of predetermined width, a distortion of those elements in a captured image can indicate a consequential distortion of the reference mark(s) and their relative locations. For example, while in actuality the relative location of the reference mark 60*a* and 60*b* may be the same, that may not appear as such if the barcode 42 is not parallel to the imager 20. Furthermore, the overall appearance of the reference mark 60 may also be distorted on each of the images (see embodiment of FIGS. 6A and 6B for example). In this case, the controller may be configured to evaluate each portion 48, 52, determine the apparent distortion in the captured images, and correct for that distortion prior to locating the reference mark(s), after locating the reference marks but prior to determining the relative locations of the reference mark(s) relative to the matching parts, or after determining the relative locations of the reference mark(s) but prior to the subtraction of those relative locations. Preferably, the correction taking place prior to locating the reference mark(s) includes correction of the shape of the imaged reference marks. This can help with the location of a reference mark common to both images when, as a result of distortion, the reference mark appears sufficiently different.

Depending on the embodiment, distortion correction may be implemented on the entire image or on any particular section(s) of the image such as, for example, the section containing a portion of the barcode or the section which may/does contain any of the reference mark(s). The latter implementation may be particularly useful as it could avoid unnecessary image processing of sections of images which are not used. Additionally, as used herein, distortion correction is meant to refer to correcting the distortion such that the corrected images/sections either have no distortion or share the same distortion. For example, objects captured over multiple images may be corrected to be perpendicular to the imager, or an object in one image may be transformed to the perspective space of other image. As such, distortion correction may not have to be implemented across all images/objects.

Figure 4:
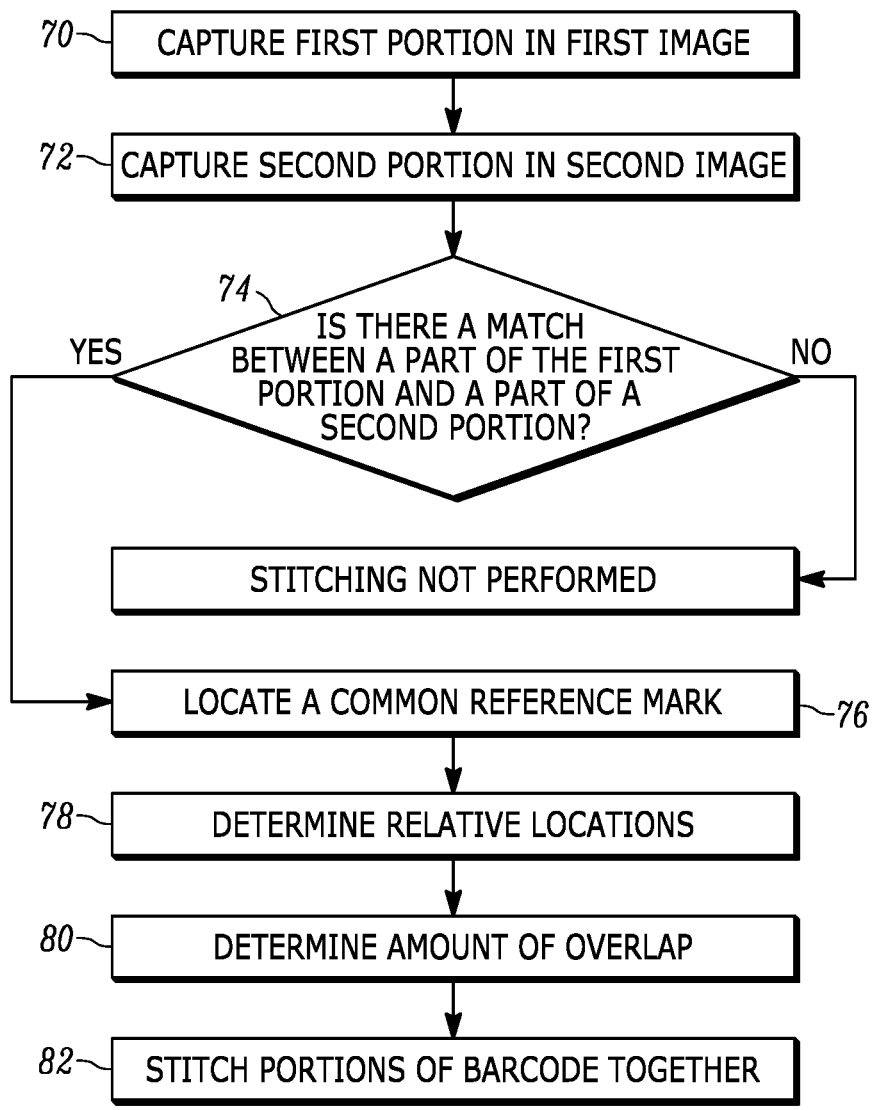
FIG. 4 is a flowchart representative of a method of stitching a barcode in accordance with an embodiment of the present invention.

FIG. 4 illustrates a flowchart representative of a method of stitching a barcode implemented in the description of the embodiment of FIG. 3. As illustrated, at step 70, the imager captures a first portion of the barcode in a first image and at step 72 the imager captures a second portion of the barcode in a second image. Following the capture, at step 74 the controller determines if there is a match between a part of the first portion of the barcode and a part of the second portion of the barcode, where each respective part abuts an edge of its respective image. If no such match is detected, no stitching operation is performed. Otherwise, in step 76 the controller locates a common reference mark in both images that is within some proximity to the respective matching parts, and in step 78 the controller determines the relative location, in each image, of the reference mark and the respective matching parts. Prior to or during steps 76 and 78, the controller may implement any number of distortion correction procedures to address potential distortion-related differences in the appearance of various elements in the respective images. Next in step 80, based on the distance between the relative locations of the reference mark, an amount of overlap is determined between the matching parts, and finally, in step 82 the first portion of the barcode and the second portion of the barcode (or the strings encapsulated therein) are stitched together such that the previously determined overlap between the matching parts is maintained. Optionally, before step 82, the amount of overlap may be examined against a threshold where the method proceed to step 82 only if the threshold is met.

While in the above-described embodiment, the stitching step is performed based in part on the relative locations of the reference mark(s), it is also possible to use the relative locations as a means for validating an already executed stitching operation. Referring back to FIGS. 3A and 3B, upon the detection matching parts 56, 58, the controller 32 may be configured to stitch the first portion 48 and the second portion 52 (or the strings encapsulated therein) based on a premise that the matched parts 56, 58 will overlap entirely. The correctness of this operation can then be validated by configuring the controller to evaluate the locations of at least one of the reference marks 60*a*, 62*a* (relative to the matching part 56 of the first image 44) and the locations of a respective at least one of the reference marks 60*b*, 62*b* (relative to the matching part 58 of the second image 46). Similar to the above-embodiment, one evaluation technique may involve determining the distance between the relative locations (via, e.g., subtracting one relative location from a respective another relative location) and evaluating that distance (via, e.g., determining whether the value resulting from the subtraction falls within a predefined threshold). If, in case of evaluating a subtraction result, the resulting value does fall within the predefined threshold, then the prior stitching operation is deemed valid and a decode of the barcode may take place. Otherwise the prior stitching operation is deemed invalid and the barcode is considered to not be read properly. Also similar to the above-embodiment, distortion correction can be implemented at an appropriate state of the stitching and/or validation process.

Figure 5:
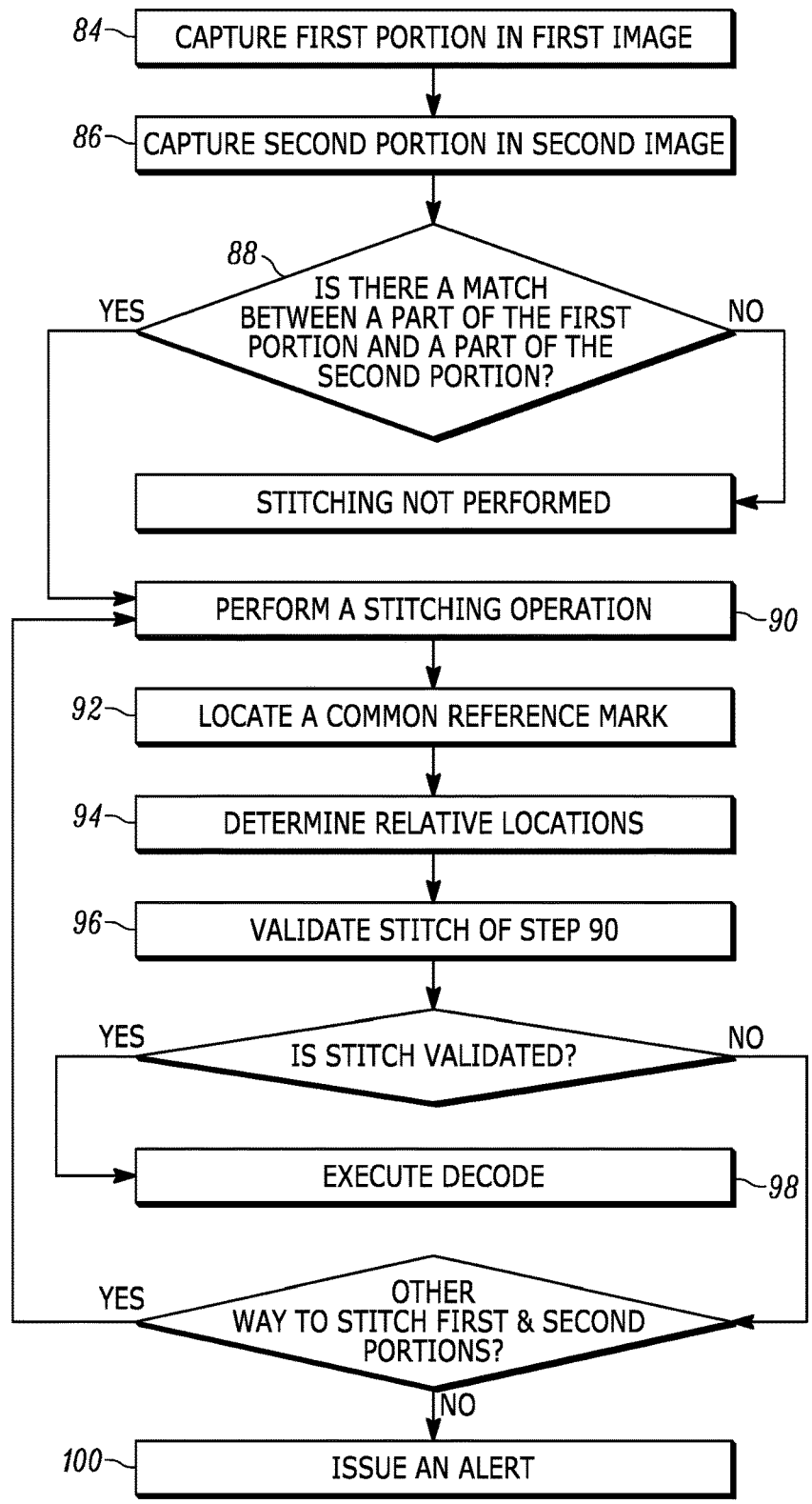
FIG. 5 is a flowchart representative of a method of stitching a barcode in accordance with an embodiment of the present invention.

FIG. 5 illustrates a flowchart representative of the embodiment where the relative locations are used for validation. As illustrated, at step 84, the imager captures a first portion of the barcode in a first image and at step 86 the imager captures a second portion of the barcode in a second image. Next, at step 88 the controller determines if there is a match between a part of the first portion and a part of the second portion, where each respective part abuts an edge of its respective image. If no such match is detected, no stitching operation is performed. Otherwise, in step 90, the controller stitches the first portion and the second portion (or the strings encapsulated therein) such that (i) the matching parts entirely overlap, (ii) such that the matching parts partially overlap and the total length of the barcode and/or total number of characters represented by the barcode meet a predefined value, or (iii) pursuant to some other predetermined algorithm. Once the stitching has been performed, in step 92 the controller locates a common reference mark in both images that is within some proximity to the respective matching parts, and in step 94 the controller determines the relative location, in each image, of the reference mark (the relative location being relative to the respective matching parts). Thereafter, in step 96 the relative locations are used to validate the stitch of step 90. As previously described, this can be done by subtracting one relative location from another and determining if the resulting value falls within a predefined threshold. If the stitch is validated, in step 98 a decode operation can be executed. If, on the other hand, the validation is not successful, the controller can evaluate if the first portion and the second portion (or the strings encapsulated therein) can be stitched in another way so as to maintain a partial overlap between the matching parts. When such a possibility exists, the controller can return to step 90 to execute the stitching operation and thereafter proceed once again to the validating step (optionally bypassing steps 92 and 94). When the possibility of an alternate stitching is not present, the controller may issue an instruction for the scanner to provide an alert that the barcode was not decoded properly. In some configurations, the controller can continue the decode session with or without an alert, monitoring at least some of the captured images for possible stitching configurations.

Although the embodiment of FIGS. 3A and 3B provided an example where the barcode 42 was imaged such that its first portion 48 abutted the image edge 50 and its second portion abutted the image edge 54, the concepts described therein can be equally applied to instances where a portion of the barcode is defined by an area that is decodable by the controller. This may become more clear with reference to FIGS. 6A and 6B which, respectively illustrate two images depicting different portions of the same barcode 102.

Figure 6A:
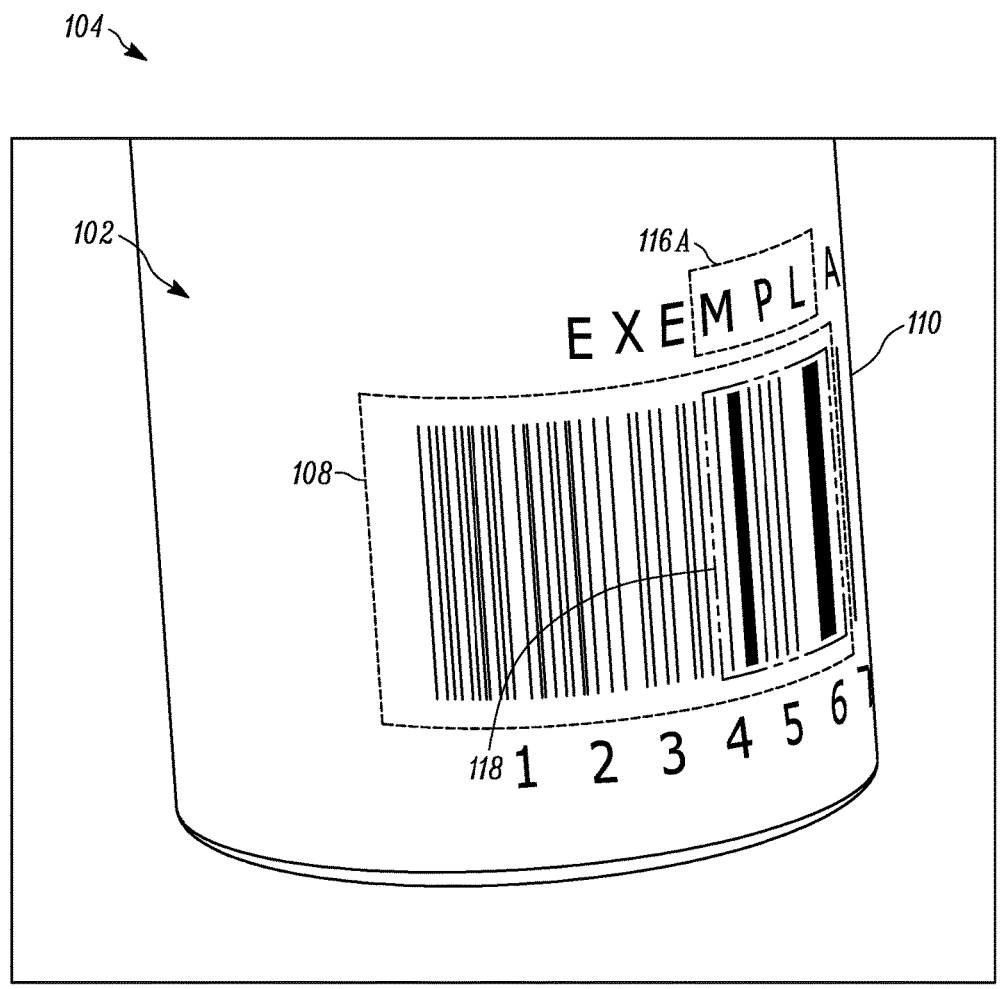
FIGS. 6A and 6B are, respectively, first and second images capturing a single barcode in accordance with an embodiment of the present invention.
Figure 6B:
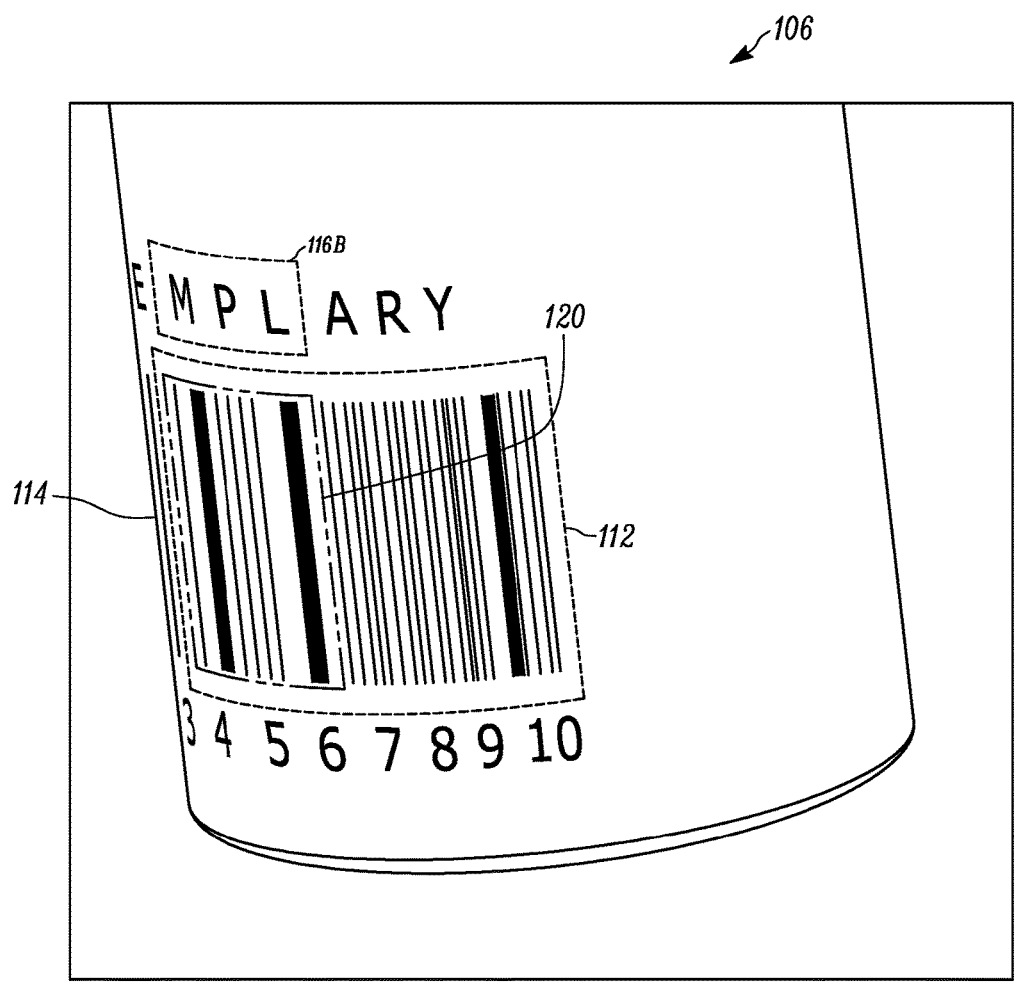

In particular, FIG. 6A depicts a first image 104 and FIG. 6B depicts a second image 106. Captured within the first image 104 is a first portion 108 of the barcode 102 that extends to/abuts an edge 110 that is defined by a boundary of the decodable section of the barcode 102. Captured within the second image 106 is a second portion 112 of the barcode 42 that extends from/abuts an edge 114 that is defined by a boundary of the decodable section of the barcode 102. In addition to capturing portions of the barcode 102, each image captures at least one reference mark (e.g., 116a, 116b). As in the previous embodiments, a part 118 of the first portion 108 of the barcode 102 matches another part 120 of the second portion 112, and the controller is configured to recognize such a match between the two matching parts 118, 120. Having these elements made available to the controller, it can now proceed with the stitching/validation operations outlined above.

The difference between the embodiment of FIGS. 3A-3B and the embodiment of FIGS. 6A-6B primarily lies in the notion that each portion of the barcode does not have to extend to an edge of an image. Instead, it can extend to/extend from/abut some point (a boundary) in the image that separates a decodable section of the barcode and a non-decodable section of the barcode. Furthermore, in the embodiment of FIGS. 6A-6B, it would be advantageous to perform distortion correction prior to locating the reference mark(s). For instance, while the letter "L" (which, in its entirety, may be selected as a reference mark) is the same letter in both images 104 and 106, its appearance is altered between the two images due to its position on a cylindrical surface and how that surface is imaged by the scanner. In image 104, the "L" appears significantly more narrow than in image 106. As such, without distortion correction the controller may not recognize that the "L" in both images depicts the same, common reference mark. Implementing distortion correction may resolve this issue, allowing the controller to make more accurate associations between reference mark(s) and the various elements present in the images. Moreover, implementing distortion correction before the detection of the matching parts 118, 120 may also improve accuracy of the detection process.

Although in cases such as this, distortion correction may provide significant adjustment of the image(s)/object(s), factors like noise and imprecision of calculations may still cause the distortion-corrected image(s)/object(s) to not appear entirely the same. As such, setting a particular threshold when evaluating the relative locations may provide for an acceptable level of tolerance in rendering the overall stitching/validation decision.

It should be understood that while the embodiments described above have been described with reference to capturing the entire barcode with two images, the same principles could be extended to stitching and/or validating barcodes which span more than two images. For instance, using a scanner with an imager running at 30 frames per second (FPS), a user may require one second to swipe the scanner over the entire barcode so as to capture it in its entirety. Such a scan will result in the barcode being captured over 30 images, with each image capturing some portion of the barcode. It is then possible to apply the concepts provided above to stitch/verify the barcode using all 30 barcode portions in accordance with an embodiment of the present invention. However, in such a case, it may be advantageous to drop at least some images from the set of 30 while still capturing the entire barcode in the remaining images.

Finally, it should be noted that stitching/validation methods described herein which rely on relative locations and measurements between those locations can be particularly advantageous from the point of view that they may avoid a pixel-by-pixel comparison of various parts of the images (e.g., the reference mark(s)). Since pixel-by-pixel image analysis can be computationally intensive, it may require things like a faster, more-expensive controller and/or additional power (which in the event of the device being battery powered can shorten the devices operational time). Avoiding such intensive image analysis could provide a more efficient approach to barcode stitching and/or validation.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of stitching a machine-readable code representing an encoded string, the method comprising:
   in a first image, optoelectrically capturing a first portion of the machine-readable code, the first portion extending to a first boundary;
   in a second image, optoelectrically capturing a second portion of the machine-readable code, the second portion being different from the first portion, the second portion extending to a second boundary;
   determining a presence of a match between a first matching part of the first portion and a second matching part of the second portion, the first matching part abutting the first boundary and the second matching part abutting the second boundary;
   responsive to the presence of the match, determining a presence of an overlap between the first matching part and the second matching part; and
   responsive to the presence of the overlap, stitching the first portion of the machine-readable code with the second portion of the machine-readable code, the stitching being based at least in part on the overlap,
   wherein the determining the presence of the overlap includes:
      determining a presence of a reference mark in the first image and in the second image;
      determining a first relative location of the reference mark relative to the first matching part;
      determining a second relative location of the reference mark relative to the second matching part; and
      evaluating the first relative location and the second relative location.

2. The method of claim 1, wherein the first boundary is one of an edge of the first image or a boundary separating a decodable part and a non-decodable part of a first section of the machine-readable code captured in the first image.

3. The method of claim 2, wherein the second boundary is one of an edge of the second image or a boundary separating a decodable part and a non-decodable part of a second section of the machine-readable code captured in the second image.

4. The method of claim 1, wherein the evaluating the first relative location and the second relative location includes:
   subtracting one of the first relative location or the second relative location from the other one of the first relative location or the second relative location to obtain a resulting value; and
   determining the presence of the overlap based at least in part on the resulting value.

5. The method of claim 1, further comprising:
   correcting a first distortion in the first image, the correcting the first distortion being based at least in part on a predefined characteristic of the machine-readable code and a modified presence of the predefined characteristic in the first portion of the machine-readable code.

6. The method of claim 5, further comprising:
   correcting a second distortion in the second image, the correcting the second distortion being based at least in part on the predefined characteristic and a modified presence of the predefined characteristic in the second portion of the machine-readable code.

7. The method of claim 1, wherein the stitching the first portion of the machine-readable code with the second portion of the machine-readable code includes at least one of (i) stitching the first portion and the second portion on a pixel-by-pixel level, (ii) stitching the first portion and the second portion on an element-by-element level, (iii) stitching the first portion and the second portion on a codeword-by-codeword level, or (iv) stitching the first portion and the second portion on a decoded character-by-decoded character level.

8. A method of stitching a machine-readable code representing an encoded string, the method comprising:

in a first image, optoelectrically capturing a first portion of the machine-readable code, the first portion extending to a first boundary;
in a second image, optoelectrically capturing a second portion of the machine-readable code, the second portion being different from the first portion, the second portion extending to a second boundary;
determining a presence of a match between a first matching part of the first portion and a second matching part of the second portion, the first matching part abutting the first boundary and the second matching part abutting the second boundary;
responsive to the presence of the match, stitching the first portion of the machine-readable code with the second portion of the machine-readable code, the stitching being based at least in part on the match and producing a stitched element; and
verifying a validity of the stitched element by:
determining a presence of a reference mark in the first image and in the second image;
determining a first position of the reference mark relative to the first matching part;
determining a second position of the reference mark relative to the second matching part; and
evaluating the first position and the second position.

9. The method of claim 8,
wherein the determining the first position of the reference mark relative to the first matching part includes determining a first relative location of the reference mark relative to the first matching part,
wherein determining the second position of the reference mark relative to the second matching part includes determining a second relative location of the reference mark relative to the second matching part; and
wherein the evaluating the first position and the second position includes evaluating the first relative location and the second relative location.

10. The method of claim 9, wherein the evaluating the first relative location and the second relative location includes:
subtracting one of the first relative location or the second relative location from the other one of the first relative location or the second relative location to obtain a resulting value;
determining that the stitched element is valid when the resulting value is within a predetermined threshold; and
determining that the stitched element is invalid when the resulting value is outside of the predetermined threshold.

11. The method of claim 8, further comprising:
responsive to the stitched element being invalid, adjusting an overlap between the first matching part and the second matching part, the overlap being present in the stitched element.

12. The method of claim 8, further comprising:
correcting a first distortion in the first image, the correcting the first distortion being based at least in part on a predefined characteristic of the machine-readable code and a modified presence of the predefined characteristic in the first portion of the machine-readable code.

13. The method of claim 12, further comprising: correcting a second distortion in the second image, the correcting the second distortion being based at least in part on the predefined characteristic and a modified presence of the predefined characteristic in the second portion of the machine-readable code.

14. The method of claim 8, wherein the first boundary is one of an edge of the first image or a boundary separating a decodable part and a non-decodable part of a first section of the machine-readable code captured in the first image, and
wherein the second boundary is one of an edge of the second image or a boundary separating a decodable part and a non-decodable part of a second section of the machine-readable code captured in the second image.

15. The method of claim 8, wherein the stitching the first portion of the machine-readable code with the second portion of the machine-readable code includes at least one of (i) stitching the first portion and the second portion on a pixel-by-pixel level, (ii) stitching the first portion and the second portion on an element-by-element level, (iii) stitching the first portion and the second portion on a codeword-by-codeword level, or (iv) stitching the first portion and the second portion on a decoded character-by-decoded character level.

16. A method of stitching a machine-readable code representing an encoded string, the method comprising:
in a first image, optoelectrically capturing a first portion of the machine-readable code, the first portion extending to a first boundary;
in a second image, optoelectrically capturing a second portion of the machine-readable code, the second portion being different from the first portion, the second portion extending to a second boundary;
determining a presence of a match between a first matching part of the first portion and a second matching part of the second portion, the first matching part abutting the first boundary and the second matching part abutting the second boundary;
determining a first overlap between the first matching part and the second matching part, the first overlap being one of a complete overlap or a partial overlap;
responsive to the presence of the match, stitching the first portion of the machine-readable code with the second portion of the machine-readable code, the stitching being based at least in part on the first overlap and producing a stitched element; and
verifying a validity of the stitched element by:
determining a presence of a reference mark in the first image and in the second image;
determining a first position of the reference mark in the first image;
determining a second position of the reference mark in the second image; and
evaluating the first position and the second position.

17. The method of claim 16, wherein the first boundary is one of an edge of the first image or a boundary separating a decodable part and a non-decodable part of a first section of the machine-readable code captured in the first image, and
wherein the second boundary is one of an edge of the second image or a boundary separating a decodable part and a non-decodable part of a second section of the machine-readable code captured in the second image.

18. The method of claim 16,
wherein the determining the first position of the reference mark includes determining a first relative location of the reference mark relative to the first matching part,
wherein determining the second position of the reference mark includes determining a second relative location of the reference mark relative to the second matching part; and
wherein the evaluating the first position and the second position includes evaluating the first relative location and the second relative location.

19. The method of claim 18, wherein the evaluating the first relative location and the second relative location includes:
  subtracting one of the first relative location or the second relative location from the other one of the first relative location or the second relative location to obtain a resulting value;
  determining that the stitched element is valid when the resulting value is within a predetermined threshold; and
  determining that the stitched element is invalid when the resulting value is outside of the predetermined threshold.

20. The method of claim 16, further comprising:
  responsive to the stitched element being invalid, adjusting the first overlap from the one of the complete overlap or the partial overlap to another of the complete overlap or the partial overlap.

21. The method of claim 16, further comprising:
  correcting a first distortion in the first image, the correcting the first distortion being based at least in part on a predefined characteristic of the machine-readable code and a modified presence of the predefined characteristic in the first portion of the machine-readable code; and
  correcting a second distortion in the second image, the correcting the second distortion being based at least in part on the predefined characteristic and a modified presence of the predefined characteristic in the second portion of the machine-readable code.

22. The method of claim 16, wherein the stitching the first portion of the machine-readable code with the second portion of the machine-readable code includes at least one of (i) stitching the first portion and the second portion on a pixel-by-pixel level, (ii) stitching the first portion and the second portion on an element-by-element level, (iii) stitching the first portion and the second portion on a codeword-by-codeword level, or (iv) stitching the first portion and the second portion on a decoded character-by-decoded character level.

23. A method of stitching a machine-readable code representing an encoded string, the method comprising:
  in a first image, optoelectrically capturing a first portion of the machine-readable code, the first portion extending to a first boundary;
  in a second image, optoelectrically capturing a second portion of the machine-readable code, the second portion being different from the first portion, the second portion extending to a second boundary;
  determining a presence of a match between a first matching part of the first portion and a second matching part of the second portion, the first matching part abutting the first boundary and the second matching part abutting the second boundary;
  responsive to the presence of the match, determining a presence of an overlap between the first matching part and the second matching part;
  responsive to the presence of the overlap, stitching the first portion of the machine-readable code with the second portion of the machine-readable code, the stitching being based at least in part on the overlap; and
  correcting a first distortion in the first image, the correcting the first distortion being based at least in part on a predefined characteristic of the machine-readable code and a modified presence of the predefined characteristic in the first portion of the machine-readable code.

* * * * *